US006353996B1

(12) United States Patent
Albeck et al.

(10) Patent No.: US 6,353,996 B1
(45) Date of Patent: Mar. 12, 2002

(54) APPARATUS FOR WIRING ELECTRICAL TERMINALS OF ELECTRICAL DEVICES OR SYSTEMS

(75) Inventors: Bernhard Albeck, Lorch-Waldhausen; Stefan Koller, Weinstadt-Grossheppach, both of (DE)

(73) Assignee: Vosslob-Schwabe Elektronik GmbH, Urbach (DE)

( * ) Notice: Subject to any disclaimer, the term of this patent is extended or adjusted under 35 U.S.C. 154(b) by 0 days.

(21) Appl. No.: 08/902,453

(22) Filed: Jul. 29, 1997

(30) Foreign Application Priority Data

Aug. 13, 1996 (DE) .......................................... 196 32 511

(51) Int. Cl.[7] .......................... B23P 19/02; H01R 43/20

(52) U.S. Cl. .......................... 29/755; 29/863; 29/566.1; 29/564.8; 29/33 F; 140/93 R

(58) Field of Search .............................. 29/33 F, 33 M, 29/863, 56.6, 566.1, 566.3, 564.7, 564.8, 755; 140/93 R

(56) References Cited

U.S. PATENT DOCUMENTS

| | | | | | |
|---|---|---|---|---|---|
| 3,930,524 | A | * | 1/1976 | Tarbox | 140/93 |
| 4,219,913 | A | * | 9/1980 | Johnson | 29/33 M |
| 4,271,573 | A | * | 6/1981 | Von Roesgen | 29/33 M |
| 4,461,061 | A | * | 7/1984 | Rock | 29/33 M |
| 4,679,881 | A | | 7/1987 | Galvin et al. | |
| 4,703,543 | A | | 11/1987 | Aceti et al. | |
| 4,781,227 | A | * | 11/1988 | Cross | 140/92.1 |
| 5,442,848 | A | | 8/1995 | Koller et al. | |
| 5,459,924 | A | * | 10/1995 | Ohsumi et al. | 29/33 F |
| 5,515,606 | A | * | 5/1996 | Albeck et al. | 29/850 |

FOREIGN PATENT DOCUMENTS

| | | |
|---|---|---|
| DE | 1 290 215 | 3/1969 |
| DE | 32 36 868 A1 | 5/1983 |
| DE | 42 18 741 A1 | 12/1993 |
| DE | 43 12 777 A1 | 10/1995 |
| EP | 0 573 791 A1 | 12/1993 |

* cited by examiner

*Primary Examiner*—Lee Young
*Assistant Examiner*—A. Dexter Tugbang
(74) *Attorney, Agent, or Firm*—Frishauf, Holtz, Goodman, Langer & Chick, P.C.

(57) ABSTRACT

For automatic wiring of terminals of electrical apparatus, for example fluorescent lamp luminaires, a line or wire-laying tool is used which has a finger (31) on which a pressure element (37), movable between three positions I, II, III with respect to the finger, and the terminal, respectively, is retained. The pressure element presses a wire (20) in an insertion slit (12) of a slit blade insulation piercing connector SBIPC (11). The pressure element (37) has a cutter blade at an end surface, and further has two pressure sections (46, 47). One section (46) is used to effect a connection at the beginning of a wire run, or for through-wiring, and the other (47) is used to terminate the end of a wire line, and to cut the wire. The finger (21) is always outside of a contacting zone (3), thus permitting miniaturization of the terminal to a degree limited only by insulation requirements of air or creep paths between adjacent SBIPCs. The terminals can thus be fitted into a raster, and are formed with grooved extensions (16) to form wire retention and introduction slots.

10 Claims, 11 Drawing Sheets

FIG.4
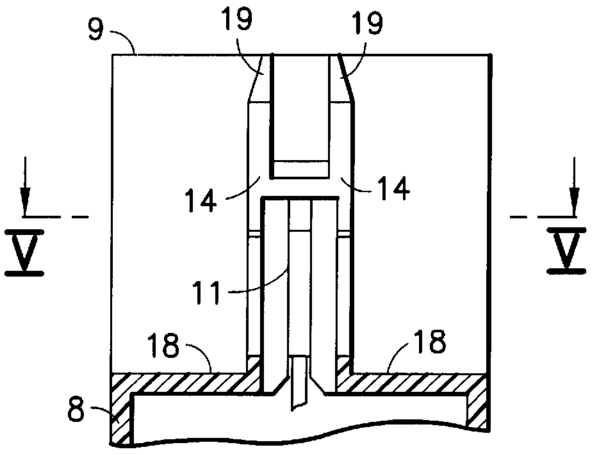
FIG.5
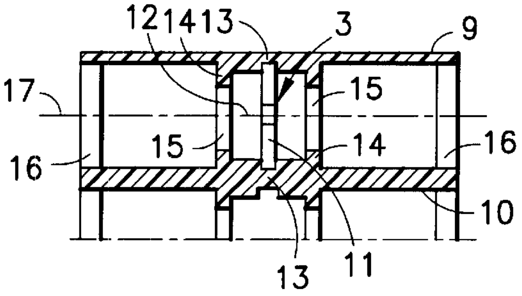
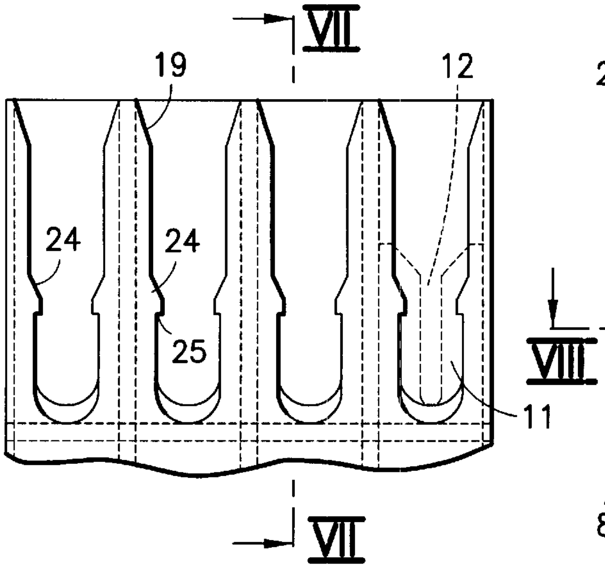
FIG.6
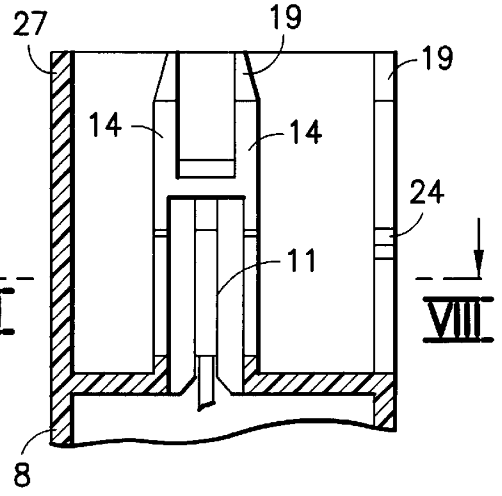
FIG.7

APPARATUS FOR WIRING ELECTRICAL TERMINALS OF ELECTRICAL DEVICES OR SYSTEMS

Reference to related patents, the disclosures of which are hereby incorporated by reference:

U.S. Pat. No. 5,442,848, Koller et al., assigned to the assignee of this application to which German 43 12 777 A1 corresponds;

U.S. Pat. No. 5,515,606, Albeck et al., assigned to the assignee of this application;

U.S. Pat. No. 3,930,524, Tarbox.

Reference to related documentation:

German 32 36 868 A1, Wallner et al.;

German 12 90 210, B.

FIELD OF THE INVENTION

The present invention relates to the technological field of wiring electrical apparatus or devices, for example luminaires, fluorescent light fixtures, or the like. The term "electrical devices" also includes terminal blocks or terminal elements which may be associated with light sockets or the like, and which have at least one terminal, or may have a number of terminals, for example to provide connection points, test points, or support points for electrical wires. Specifically, the invention is directed to a method to wire the electrical terminals of electrical devices or systems, to a wiring apparatus to carry out the method, and to terminal constructions particularly suitable when the method is used.

BACKGROUND

U.S. Pat. No. 5,515,606, Albeck et al., assigned to the assignee of the present application, and the disclosure of which is hereby incorporated by reference, describes a method to wire electrical terminals of electrical devices, aggregates or assembled units or systems, which is particularly adapted to achieve high efficiency, reliable operation, and avoidance of erroneous wiring, or errors. The method can be used in general, but is especially suitable for wiring luminaires, especially fluorescent light fixtures, which have within the luminaire separate accessory apparatus, such as ballasts. The patent describes a method which permits complete automation of the wiring of such luminaires or, in general, electrical apparatus, aggregates, assemblies and systems. It permits elimination of preassembled, or precut lines, as well as wiring harnesses, since it permits direct association of the required wires with the device, or terminals the wires are to serve.

The method is carried out, by means of a position controlled mechanical wire placement element, hereinafter and for brevity, a wiring finger, in such a way that, first, the electrical device or system has terminal blocks or the like preassembled therein. The location of the fixture, as well as of the terminals, is fixed and determined in accordance with a positioning raster. By relative movement between the preassembled device, or system, and the wiring finger, a first connection terminal is brought in the operating region of the finger and is positioned with respect thereto in proper wire-laying orientation. The wiring finger then introduces one end of an electrical wire supplied, for example, from an external wiring supply, such as a supply spool, into a contacting zone of the first terminal. It is fixed in position at the same time when an electrical contact is effected. Further relative movement between the preassembled electrical device or system and the finger, along a predetermined path, results in positioning of the line, sequentially, to further terminals all within the operating range of the wiring finger, and properly oriented positioning of the finger relative to the next terminal. During this relative movement, the line is supplied to the finger with a suitable length corresponding to the line positioning path. The continuously supplied line is introduced, at any terminal, into a contacting zone. An electrical contact is made, and the position of the wire is fixed at the terminal. The wire may be cut or not; if not, a throughwired contact is made.

The line, which is so positioned, is cut at the final end in the region of the last terminal. The cut end of the line, as well as the terminal, are so constructed that the cut end is safely received in the terminal and protected against accidental contact. The line positioning element, that is for short, the finger, is so constructed that it has a positioning finger element projecting from a housing. A conductor duct is located within the finger element. A controlled feed for the wire is provided. The finger is controlled, for example, by an industrial robot, or automatic positioning system in accordance with a preprogrammed wiring path, which places the finger adjacent the respective terminal to be contacted. The contacting zone of the terminal is formed as a Slit Blade Insulation Piercing Connector—hereinafter for short SBIPC—and the line which is to make contact at the terminal is pressed into the slit of the slit blade connector.

To place the wire into the SBIPC, a pressure element is provided movably secured on the finger and movable transverse to the axial orientation of the terminal end of a wire guide duct in the finger. The pressure element can be moved between two positions, one being a quiescent or rest position, remote from the terminal end of the wire duct, and the other a working position in which it projects over a line extending from the wire duct at one side, or at least is in approximate alignment with the upper side of the exit opening of the wire duct.

A separately controllable knife blade is located between the pressure element and the finger element as such, which cooperate with the opening surface of the wire exit opening of the wire duct, to permit cutting off the wire at the last terminal end when the positioning path of the wire has been run through.

The terminals are so constructed that they retain all the terminals within a contacting zone, and are surrounded within a housing of insulating material. The housing is formed with at least one introduction slot, open at an end, to receive the line, and further includes the SBIPC, which has its insulation piercing slit oriented to the introduction slot. The upper end of the slit is open. The SBIPC is retained in the insulating housing part in a manner to ensure that accidental contact therewith is not possible.

The housing, at least in one side thereof, and adjacent the introduction slot has an extension in form of a groove-like recess or depression, the width of which is larger than the width of the introduction slot, and the dimensions of which are so determined that a free end of a line which made contact to the SBIPC can be received in this slot, or groove-like extension. The slot or groove-like extension, as well as the housing, is generally matched to the dimensions of the wire-positioning finger and of the pressure element thereof, so that this extension can carry out a dual function:

(1) It receives a cut end of the wire at the last terminal of the wire positioning path in such a manner that it is safely retained against accidental contact. This means that the blank end of the wire cannot be reached from the outside in accordance with standard testing procedures, or at standard testing probe.

(2) The extension functions as a guide groove for the positioning finger of the positioning tool as the finger is moved over the terminal connection, and upon pressing the wire into the SBIPC by the pressure element.

The second function of the groove-like extension or depression at the terminal requires a predetermined minimum width of the depression which is substantially larger than the diameter of the wire, including its insulation. This is due to the size of the positioning finger which engages into the extension. The walls adjacent this extension duct or groove are thicker than the outer diameter of the wire insulation of the wire which is placed by the finger and located in the guide groove. This thickness dimension must also be extended to permit for slight shifting of the wire in the guide groove.

If multi-pole terminals are used, a terminal block will have a substantial width, due to the width of the slit or groove-like extension or depression of the housing at any one terminal, which is of substantially greater width than that of the wire, including insulation, itself. Some minimum dimension could not be decreased below that which is given by the width of the positioning finger and the required wall thicknesses, which are established in view of the air and surface creep path necessary for effective insulation between poles or terminals.

There are many applications where it is necessary, for example, due to space reasons, to closely move together terminals of a terminal block, or, otherwise, to make the individual terminals narrower than it was possible while retaining the groove-like depressions or extensions of the housing to permit the positioning finger to engage therein. In actual practice, it is desirable that such a device or assembly might have connection terminals of the well-known type which have grooves or extensions capable of receiving the width or thickness of the positioning finger, but which also have narrower connection points. If such narrower connection points, for space reasons, are also required, it was not possible to completely automatically wire a luminaire, or other device independently and without change in tools or wiring apparatus, in other words, to completely automate wiring of such devices or apparatus, entirely independently of the special construction of the terminals.

THE INVENTION

It is an object to improve the wiring method, the apparatus used therefor and terminals described above, which permits automatic wiring of terminal connections which are dimensioned without consideration of the dimensions of the positioning finger itself, but, rather, are dimensioned only with respect to the necessary insulation requirements, that is, the dimensions of air or creep paths to prevent spurious flash-over.

Briefly, an initial terminal connection is established between a leading end of the wire and a terminal by positioning the positioning elements of the finger spaced from the terminal, and in alignment with a terminal zone, for example above that side of the terminal;

a predetermined length of wire is fed from the positioning end of the finger over a pressure element which is so constructed that it will support and position the wire adjacent an outlet of a wire duct in the positioning finger at the side thereof remote from the contact zone. The finger end and the contact zone of the terminal are then moved towards each other, by causing relative movement, thereby pressing the wire by pressure of the pressure element into the SBIPC which is located in the contact zone, while maintaining the relative spatial position of the contact finger and the pressure element. The finger end is positioned outside of the contact zone itself and of adjacent portions of the insulated housing.

To establish a final wire connection between a trailing end of the wire and the terminal, the positioning end of the finger is positioned spaced from the final terminal, so that a portion of the wire adjacent the outlet of the wire duct in the finger end, at the side thereof remote from the contact zone of the terminal, will be supported by the pressure element; then, the finger and pressure element are moved towards each other, by causing relative movement. The pressure element, at one side, carries a knife which travels together with the pressure element, thereby cutting the wire close to the SBIPC. Immediately thereafter, by continued movement of the pressure element only, the wire is pressed into the SBIPC. The finger end, at all times, remains outside of the contact zone and the portions of the insulating housing surrounding the SBIPC.

The method, in accordance with the present invention, thus places the positioning finger, when making contact of the wire, outside of the outer dimensions of the connection terminal, that is, of the housing portions which retain the terminal element, the SBIPC, itself. The dimensions of the housing portion, thus, can be designed entirely independently on the size of the positioning finger, and with respect to insulation requirement matching only the standards, or requirements for the particular use, considering, of course, the necessary air and creep paths for safety. Reliable contact of the wire at the terminal is still ensured, without, however, requiring slowdown, or interference with automatic wiring. The method is also applicable for terminals which, in well-known manner, have slit or groove-like recesses or extensions designed to receive the contacting finger. If so, wiring can be carried out as customary, or in accordance with the above method, without making any changes in the apparatus or device, or in the wiring tools or system.

The wiring finger, in accordance with the present invention, is compact in construction and easily controlled. No additional programming or other measures are needed to control the movement by a standard industrial positioning system, robot, portal or gantry positioning arrangement. The wire is reliably pressed into the slit of the SBIPC. Guidance is provided by the pressure element, and hence by the wiring finger itself. If necessary, a pre-positioning of the wire, upon introduction of the wire into an inlet guide slot, is possible.

The terminal, as well as the terminal zones thereof, are, basically, similar to the terminals described in the referenced U.S. Pat. No. 5,515,606, Albeck et al. In contrast, however, this slot or groove-like extensions or recesses are, at least in part, so arranged that they have a width which is less, or only very slightly larger than the outer diameter of the wire including the insulation which is to be contacted by the SBIPC. Since wires and insulations are subject to dimensions and tolerances, “small or only slightly larger” is intended to mean dimensions which correspond at least approximately to the standard or design dimension of the wire and its insulation. The dimensions of these slots or recesses, however, are independent of the dimensions of the positioning finger, and the spacing of terminals can be arranged to fit a predetermined raster. Thus, wall thicknesses, widths of contacts and the like can be decreased to such an extent that a terminal raster spacing of, for example, 3.5 mm is obtained. Specifically, it is possible to minimize the air and creep paths at least in the contacting zone and of the housing portions adjacent the slot and groove-like extensions only with respect to insulation requirements.

Various types of wiring positioning elements are described in the patent literature, see, for example, U.S. Pat.

No. 3,930,524, German 12 90 210 B, and German 43 12 777 A1, to mention only a few examples. None of these wiring positioning elements can be used to carry out the present invention.

Terminals with contacting zones which include SBIPC's are well-known in many constructions, one example being that described in German 32 36 868 A1, Wallner et al. The terminals provide protection against accidental touching of a cut wire end, but, overall, are so constructed that they do not fit into a raster, or are suitable for automatically position controlled wiring.

In accordance with a feature of the invention, the wire positioning element, that is, the wire positioning finger, has a pressure element with pressure surfaces located adjacent, or in close vicinity to the wire exit opening, or outlet, from wire being supplied by the finger, for example a duct, groove or the like. A cutter blade is movable together with the pressure element. The pressure element is movable with respect to the finger in at least three positions. In a first position, the pressure surfaces are spaced from the wire outlet to permit free wire feeding therefrom; in a second position, the pressure surface is essentially in alignment with the upper edge of the wire outlet opening; and in the third position, the pressure surface is in a position below the wire outlet opening, cutting the wire and pressing it into the SBIPC.

To carry out the method, and in dependence on whether a leading end of the wire is to be contacted, a through-connection is to be established, or the wire cut at a terminal or trailing end of a connector, the pressure element moves relative to the terminal independently of movement of the finger or the pressure element and the finger move together with respect to the terminal, i.e., retain their relative spatial alignment. Thus, the pressure element may be elevated and the finger as well; the pressure element and the finger can be lowered towards the terminal, or the pressure element can be raised together with the finger; or the pressure element can be lowered beyond the lower finger.

In accordance with another feature of the invention, the terminal is so constructed that it fits into a predetermined raster pattern, and the slit or groove-like extension of the housing beyond the region where the SBIPC is located has a width which is less, or only slightly greater than the outer diameter of the wire including the insulation which is to be contacted and retained in the SBIPC connector.

DRAWINGS

FIG. 4 is a sectional view along line IV—IV of FIG. 3 of the terminal of FIG. 3;

FIG. 5 is a sectional view along line V—V of FIG. 4;

FIG. 6 is a schematic view similar to FIG. 3 illustrating another embodiment;

FIG. 7 is a sectional view along line VII—VII of FIG. 6;

Figure 20:
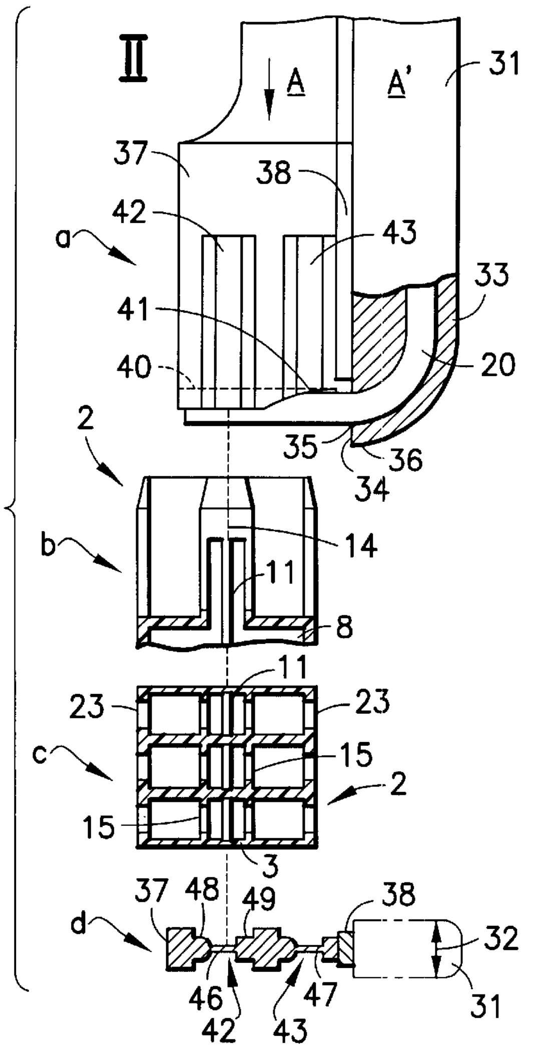
Figure 21:
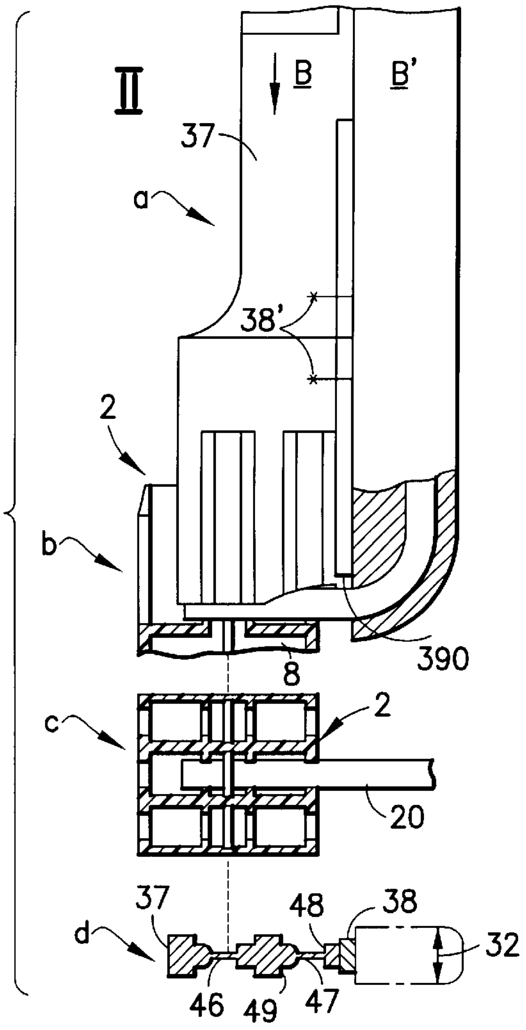
Figure 22:
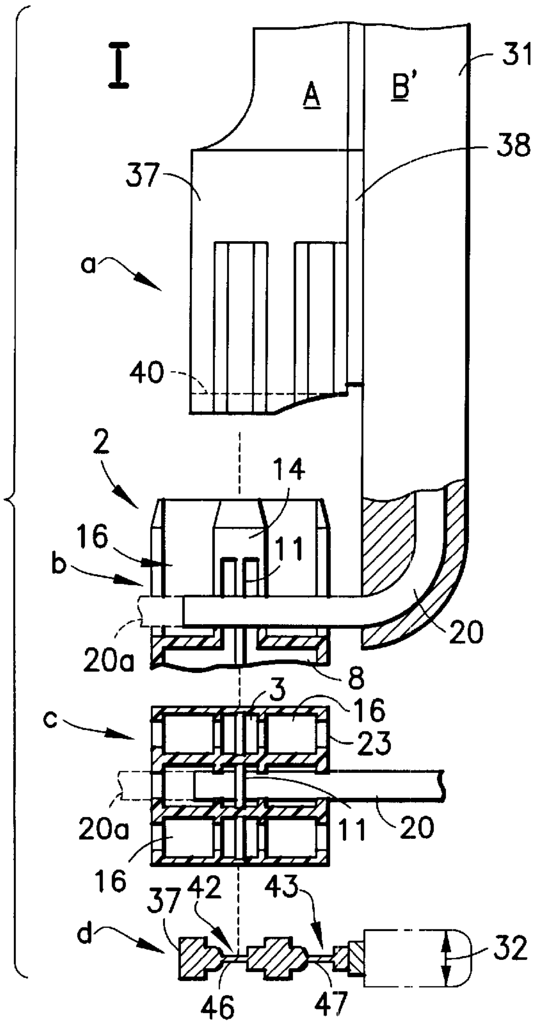
Figure 23:
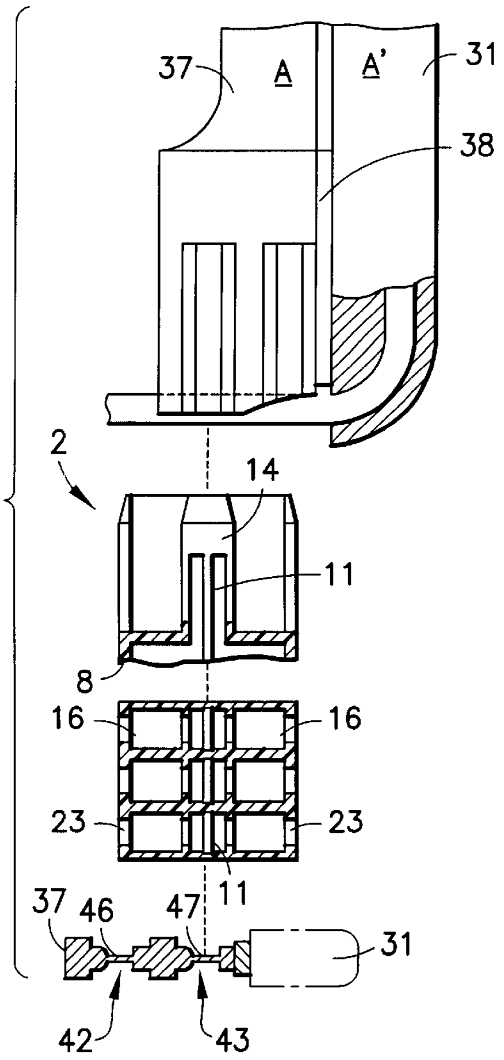
Figure 24:
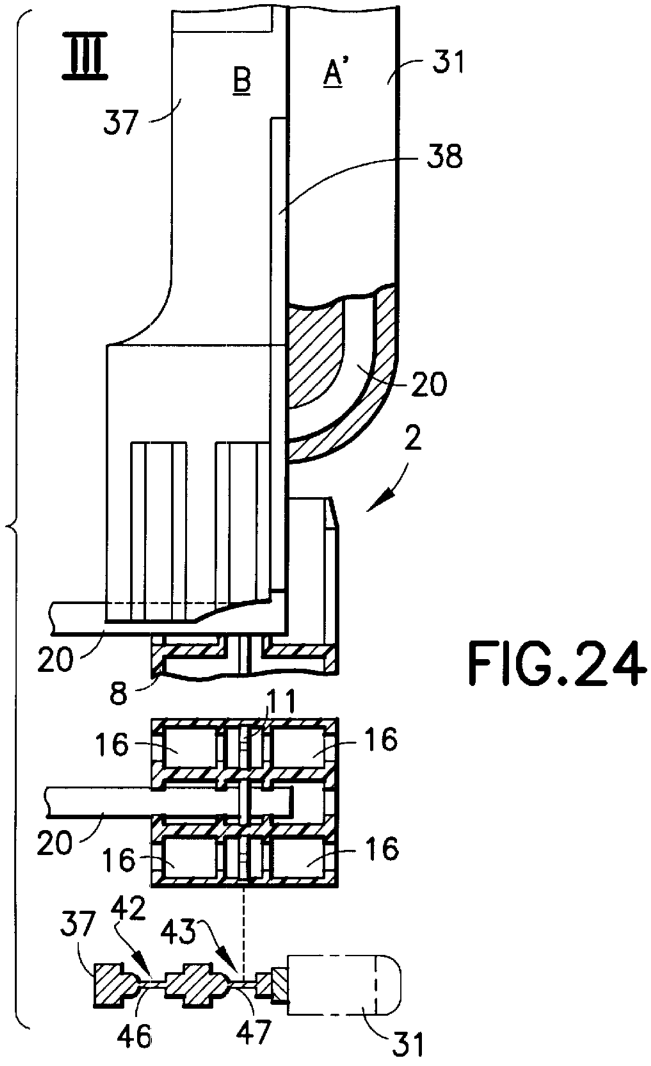
Figure 25:
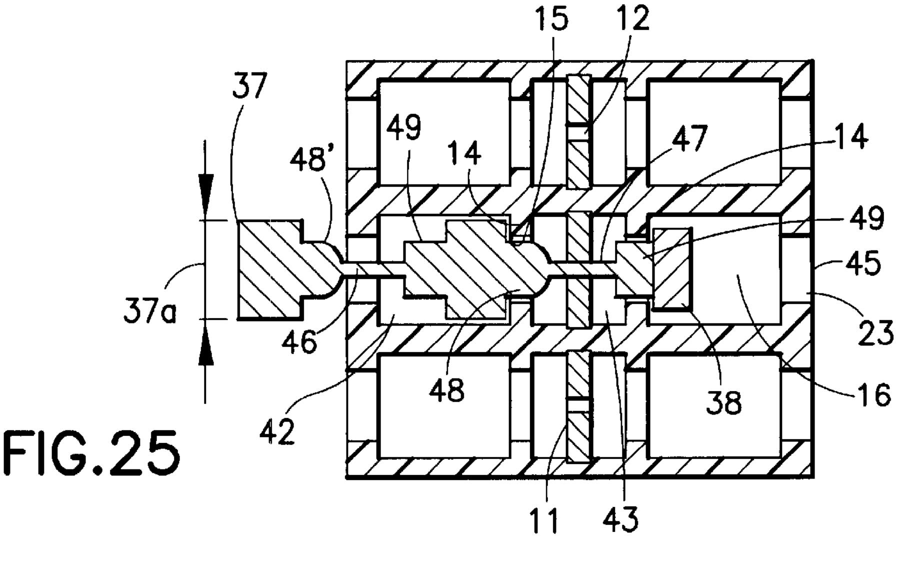
Figure 26:
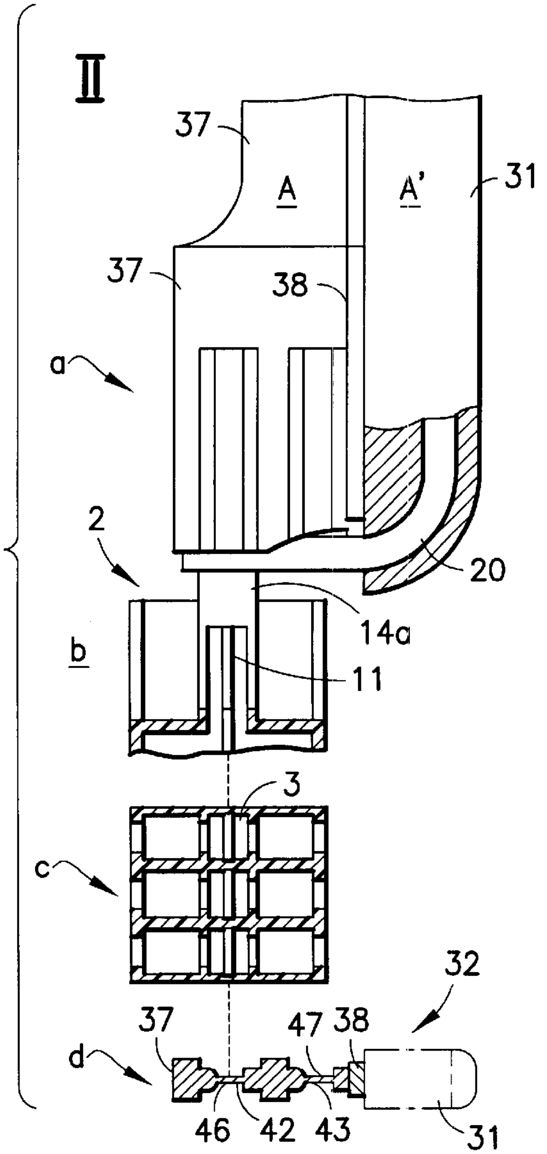
Figure 27:
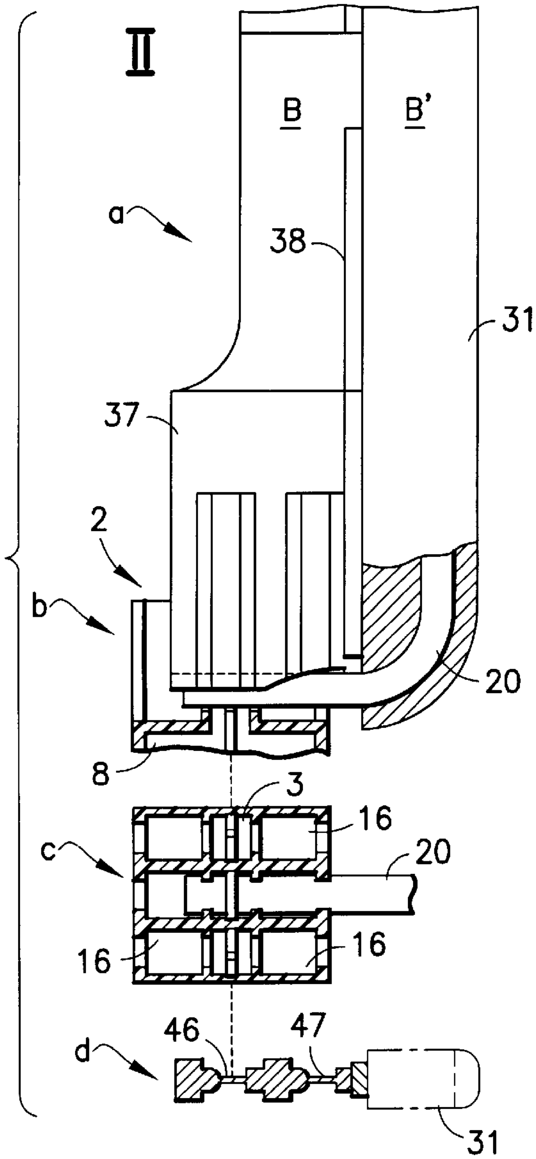
Figure 28:
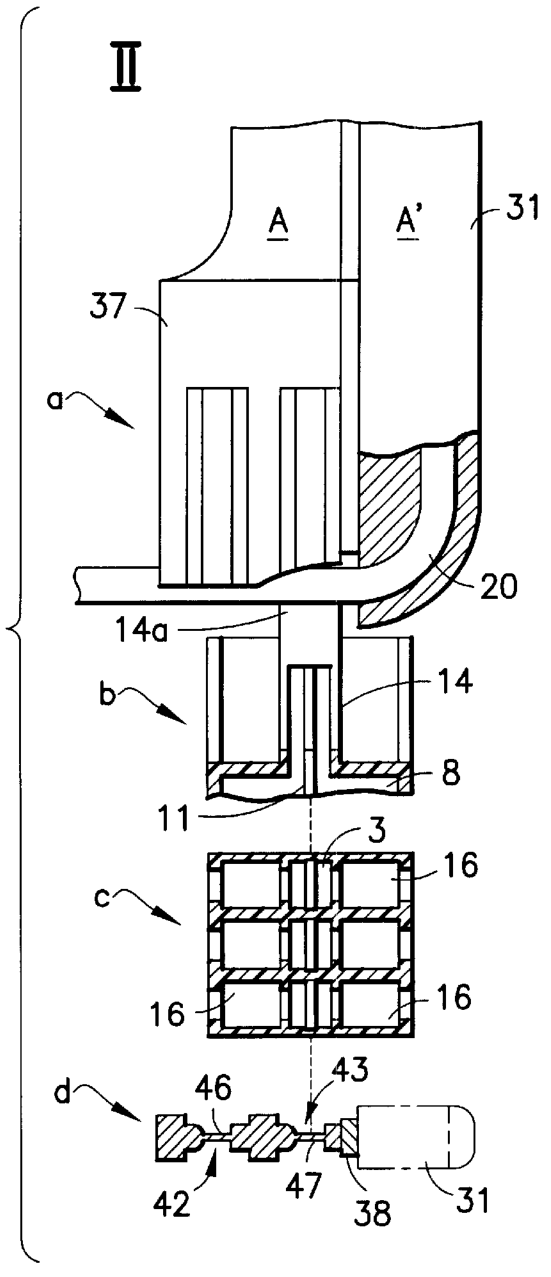
Figure 29:
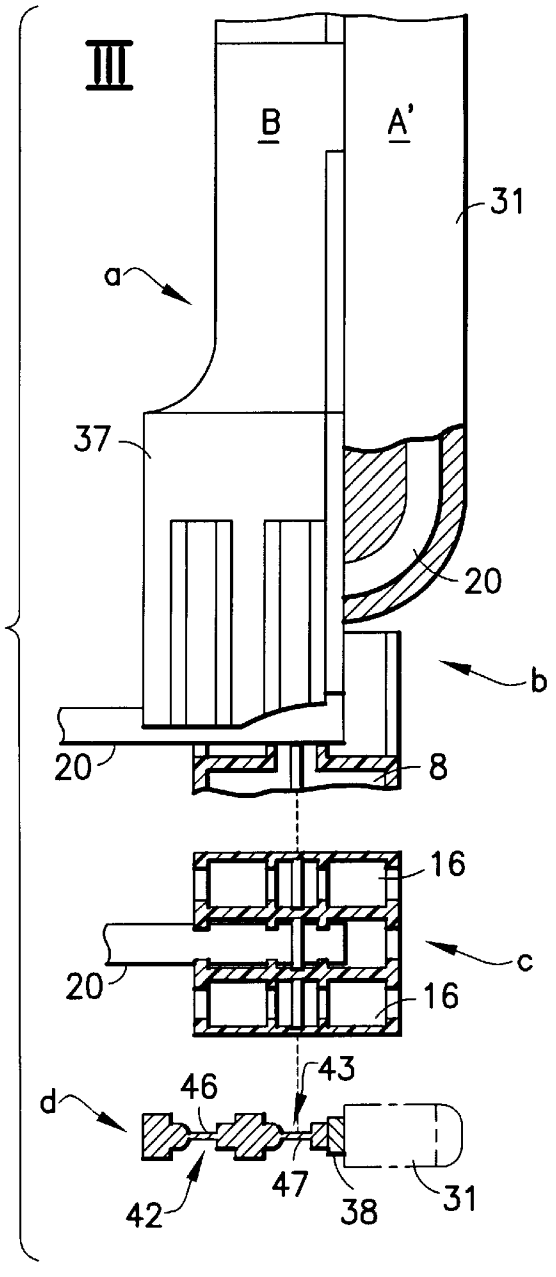

FIG. 20 is an exploded view of a line-laying finger or tool, shown highly schematically and partly in section and cut away, in which parts a, b, c and d are shown in alignment required for a line laying operation, and specifically where the tool or finger is to place a wire on a terminal, and wherein part a shows the finger for placing a wire on the terminal shown as part b, in a view similar to FIG. 4; and part c, in a view similar to FIG. 5, receives the pressure element of the part d, which is there shown in cross-section;

FIG. 21 is an exploded view illustrating the line-laying tool in another operating position;

FIG. 22 is an exploded view illustrating the line-laying tool upon completion of a line-laying operation;

FIG. 23 is an exploded view similar to FIG. 23 illustrating another phase of a line-laying operation;

FIG. 24 is an exploded view similar to FIG. 21 illustrating yet another phase of a line-laying operation;

FIG. 25 is a highly enlarged cross-sectional view similar to FIG. 5, but complete, and illustrating the position of the pressure element of the line-laying tool with respect to the terminal;

FIG. 26 is an exploded view similar to FIG. 20 illustrating yet another position in the operation of placing a wire on a terminal;

FIG. 27 is a view similar to FIG. 26 illustrating another step in the operation;

FIG. 28 is a view similar to FIG. 26 illustrating yet another position of the line-laying tool in another operation of placing a wire on a terminal; and FIG. 29 is a view similar to FIG. 28 and illustrating another phase in the operation of a line-laying tool placing the wire on a terminal.

Figure 13:
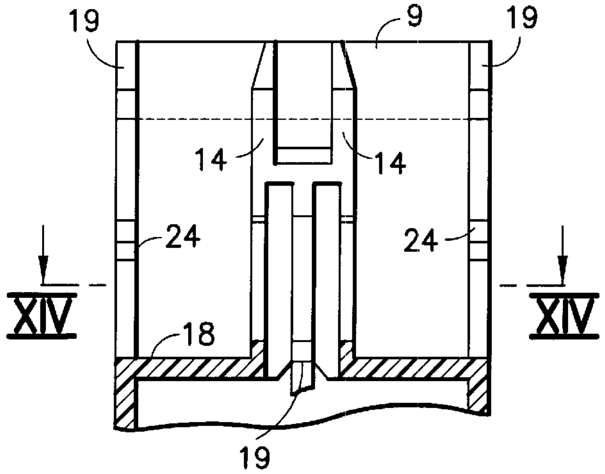
FIG. 13 is a cross-sectional view along line XIII—XIII of FIG. 12.
Figure 12:
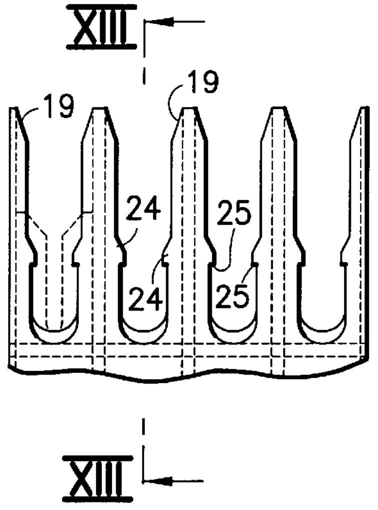
FIG. 12 is a view similar to FIG. 3, but illustrating another embodiment.
Figure 14:
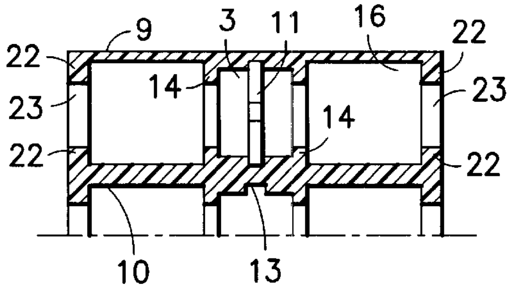
FIG. 14 is a fragmentary cross-section along line XIV—XIV of FIG. 13.
Figure 15:
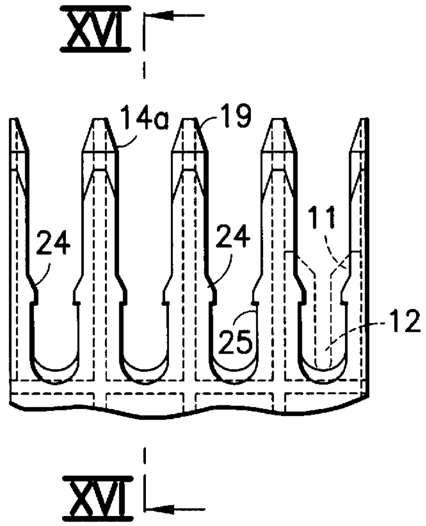
FIG. 15 is a view of the connector of FIG. 3, and illustrating another embodiment.
Figure 16:
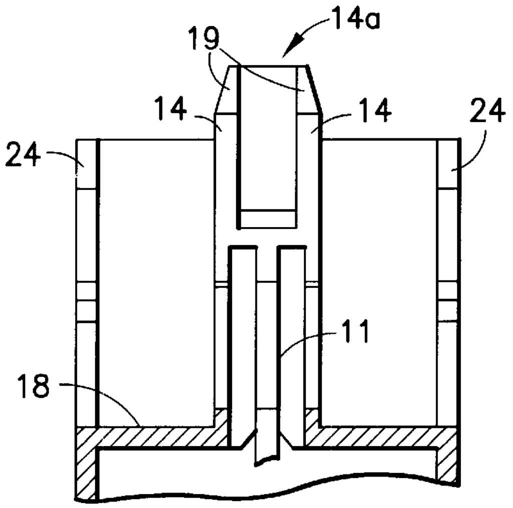
FIG. 16 is a cross-sectional view along line XVI—XVI of FIG. 15.

FIGS. 20 to 24 illustrate temporally sequential phases in the method in accordance with the present invention for wiring a first, and a last terminal of a wiring path, as well as for through-wiring a terminal, in which the terminal is constructed as illustrated in FIGS. 12, 13 and 14; and FIGS. 26 to 29 illustrate the method as explained in connection with FIGS. 20–24, where the terminal is constructed in accordance with FIGS. 15 and 16.

DETAILED DESCRIPTION

The method in accordance with the present invention can be used for a wide variety of electrical apparatus and devices; it will be described in detail with respect to wiring of fluorescent lamp luminaires or light fixtures, as, for example, described in the referenced U.S. Pat. No. 5,515,506, Albeck et al.

Figure 1:
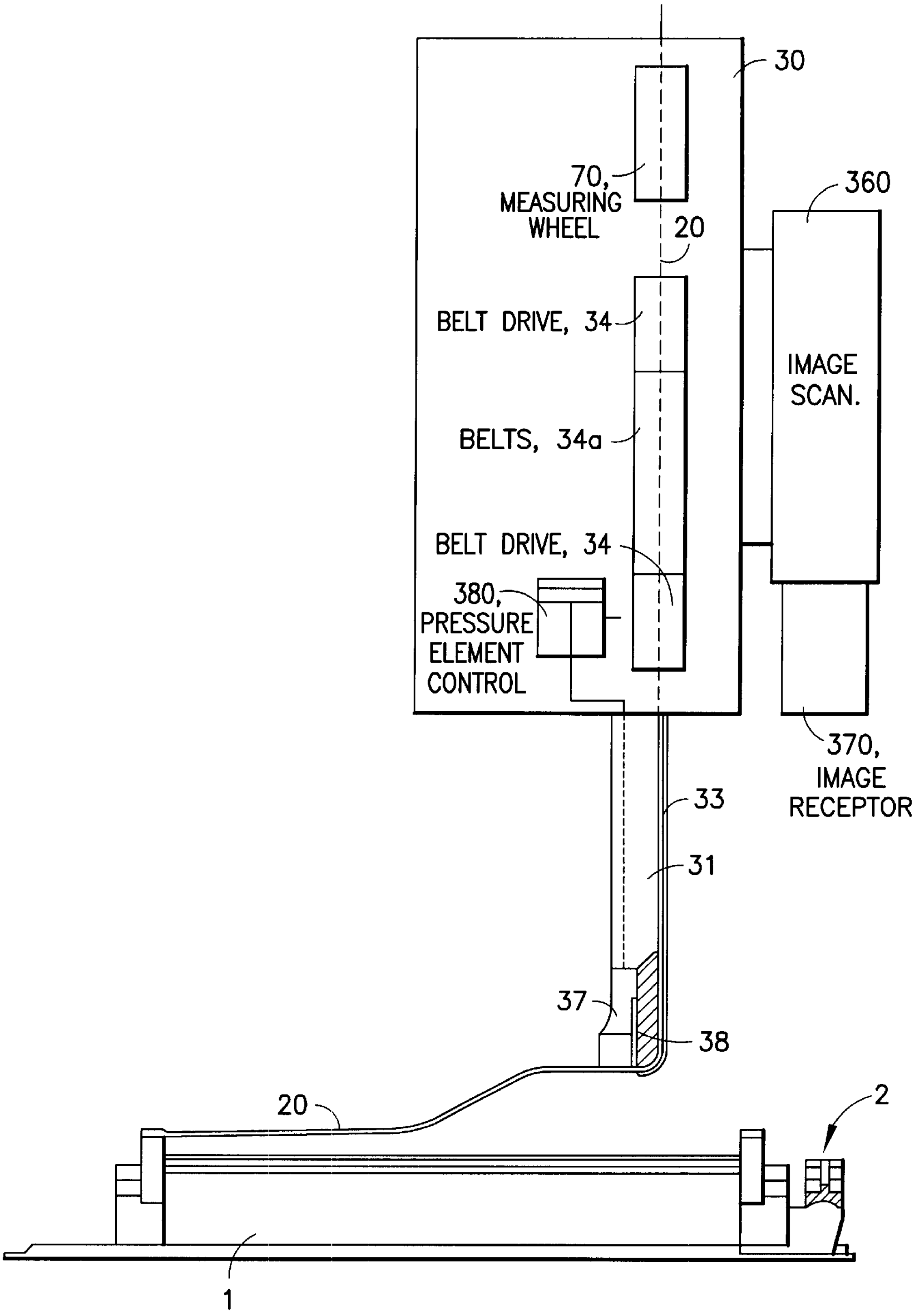
FIG. 1 is a highly schematic side view of a line-laying apparatus used for automatic wiring of an electromagnetic accessory device, such as a ballast for a fluorescent lamp luminaire.
Figure 2:
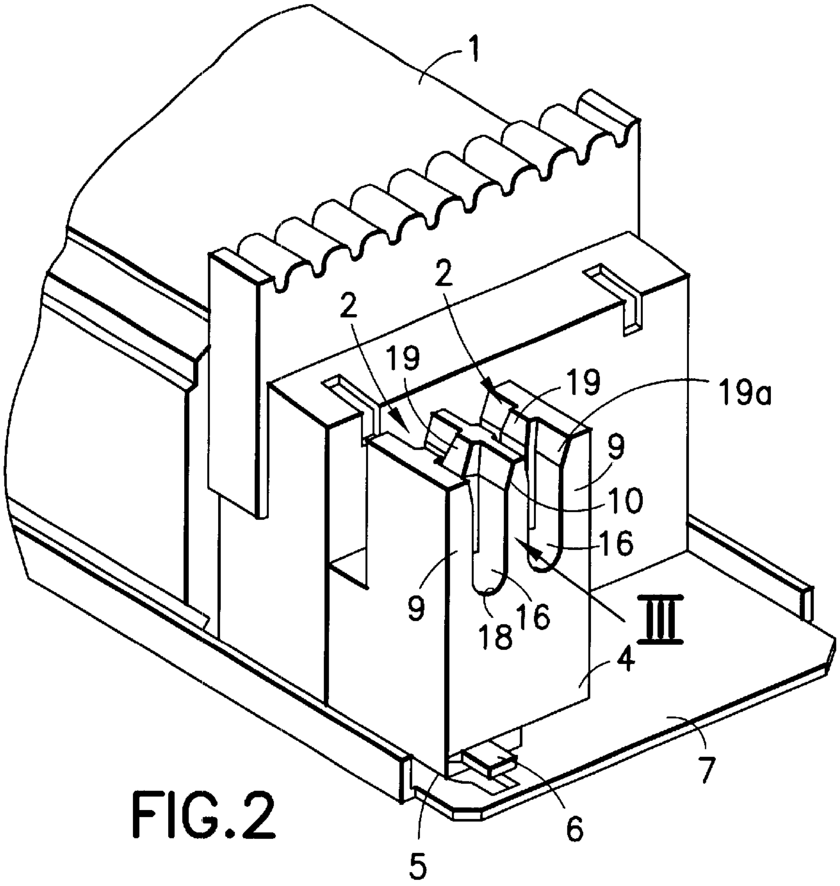
FIG. 2 is a perspective, schematic view of the connection terminal ends of the ballast of FIG. 1.

The light fixture or luminaire is first preassembled with the requisite elements thereof; a box structure, usually of metal, is fitted with the respective electrical components, placed thereon in accordance with a predetermined geometric pattern, and attached to the main support, for example a bottom panel of the luminaire box. They are there securely attached. FIGS. 1 and 2 illustrate only a ballast 1 which has the terminal block or terminal portion thereof constructed in accordance with a feature of the present invention. These terminal portions or terminal blocks 2 all are based on the general principle of a contact zone 3, which includes a slit blade insulation piercing connector (SBIPC). Details are best seen in FIGS. 2 to 5, which illustrate the basic principle.

Figure 3:
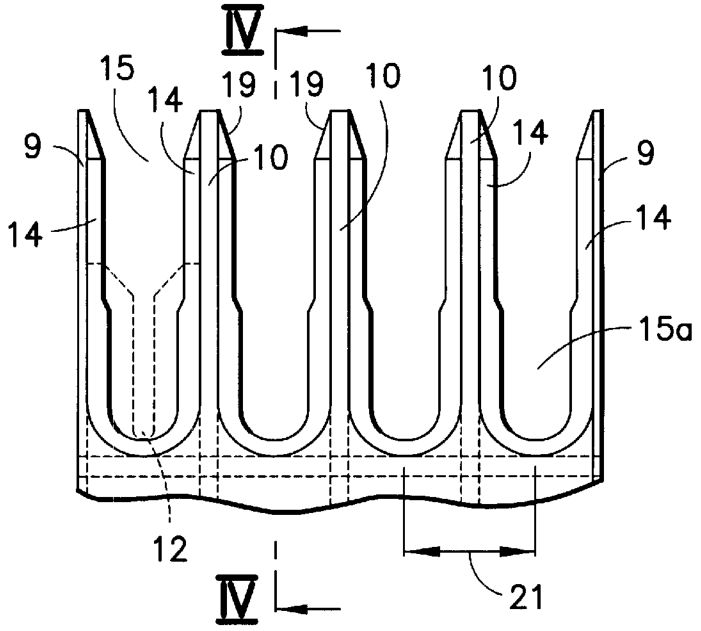
FIG. 3 is a front end view in accordance with the arrow III of FIG. 2 illustrating a multi-polar row of SBIPCs similar to those shown in FIG. 2, to a different scale and in fragmentary representation.

Each terminal position 2 has a housing 4 made of insulating material, typically of plastic, and includes an electrical wire clamping connection, for example, and as will be described in detail below, and SBIPC 11. The terminal 2 may be a single pole terminal, or, as illustrated in FIG. 2, a double-pole terminal, or can be a multi-pole terminal, as shown in FIG. 3. The housing 4 of insulating material is essentially box- or block-shaped, see FIG. 2, and the bottom thereof is formed with an attachment arrangement, for example, an attachment loop 5, or a similar arrangement, which can be fitted into a bent-up tab 6 of the base plate 7 of the ballast 1.

The base portion 8 of the housing 4, as best seen in FIG. 4, has a plurality of parallel vertical walls 9, 10, integrally formed therein. These walls 9, 10, which, see FIG. 5, delimit a contact zone 3. Each contact zone retains a metallic SBIPC 11, retained transversely to the longitudinal extent of the walls 9, 10. The SBIPC, as is well known, has a clamping or holding slit 12, open to the wire introduction side which, in FIG. 2, is at the upper side of the housing 4. The SBIPC 11, which is typically made of stamped sheet metal, is electrically conductively connected with the ballast, for example the windings of an electromagnetic ballast. Oppositely located edges of the SBIPC 11 are located in facing grooves 13 (FIG. 5) of the walls 9, 10. They are retained with some play, such that the portions of the SBIPC adjacent the slit 12 may elastically deflect when a wire is pressed into the connector. Rib-like or rail-like projections 14 are integrally formed on the housing at both sides of the SBIPC 11 on the sidewalls 9, 10, extending inwardly. The ribs or rails, in pairs, face each other and, to such facing ribs or rails define a wire insertion slot 15, which is open to the wire insertion side, and, in general, has approximately U-shaped form. These projections 14, looked at from the longitudinal direction of the walls 9, 10, are spaced from the SBIPC 11. They also form the lateral limit of the contact zone 3, and, between two longitudinally spaced ribs 14, define a chamber which, in cross-section, is essentially square. Two slot or groove-like recesses 16 extend on both sides from the insertion slots 15 of any one of the terminals 2. These groove-like slots or depressions form extensions of the insertion slots 15 and extend towards the front or rear side of the housing, respectively; they are open to the wire insertion side. These slot- or groove-like extensions 16, the insertion slots 15 and the slit 12 of the SBIPC 11, together define a common plane of symmetry 17 (FIG. 5). The depth of the extensions 16, in this example, is slightly deeper than that of the insertion slots 15. The insertion slots 15, as best seen in FIGS. 3 and 4 have, essentially, the same depth as the depth of the slit 12 of the SBIPC 11.

Other constructions are also suitable; for example, the extensions 16 may have the same depth as the insertion slots 15 and the SBIPC slits 12. In such an embodiment, the bottom wall 18 of the respective extensions 16 then will be essentially flush with the lower edge 19 of the SBIPC slit 12, as seen in FIG. 13. In such an embodiment, a wire pressed into the slit 12 to make contact with the SBIPC will lie directly, at both sides of the SBIPC 11, on the bottom of the slot or groove-like recesses or extensions 16. This provides security against possible overpressure when pressing the wire into the SBIPC, or cutting of the wire on the bottom of the SBIPC slot 12, while simultaneously decreasing the height of the entire terminal 2, at the contacting zone 3.

The walls 9, 10, in the region of the rib, or rail-like projections, are formed with inwardly directing funnel-like insertion surfaces 19, inclined inwardly; this facilitates placing a wire into the insertion slots 15. Similar funnel-like inclined insertion surfaces 19a are located on the immediately adjacent wall regions, see, for example, FIG. 2.

The length, depth, and width of each of the slot or groove-like extensions 16 is so selected that the end of a wire 20, see FIG. 21, connected and contacted in the slit 12 of the SBIPC 11, is retained within the extension, secure against accidental contact therewith. This means, that a standard safety check probe or plunger, upon testing for safety with respect to accidental contact, will not reach to the free blank face end of the conductor of the insulated wire, when a wire is cut in the vicinity of the SBIPC 11.

In accordance with a feature of the invention, the width of the extension 16 is matched to the standard outer diameter of the insulation of the wire 20. As shown, for example, in FIGS. 21 and 22, it need be only very slightly greater than this outer diameter, for example to accept tolerances, but may be equal to or even slightly less than this standard outer diameter. In any event, the width of the insertion slot 15 is selected to be somewhat less, or at the most essentially equal to the standard outer diameter of the insulation of the wire 20 to be contacted in the SBIPC 11. Upon insertion, the insulation is elastically compressed to hold the wire securely, thereby providing a strain relief or, at least, effective lateral guidance.

In accordance with a feature of the invention, adjacent terminal positions 2, or, in other words, the lateral spacing of the center line of adjacent SBIPCs can be minimized by minimizing the wall thicknesses of the sidewalls 9, 10, the widths of the SBIPCs and the widths of the groove-like extensions 16, while still maintaining a suitable thickness for the walls 9, 10, to obtain a small, previously unobtainable raster spacing of from, for example, 3.5 mm. The entire terminal, in its width and longitudinal dimension, as well as the depth dimension, if it can be fitted within a predetermined raster, can be of minimum size, which size is governed only by the requirement for the minimum air and creep paths between adjacent terminals.

Referring to FIGS. 8, 14 and 17 to 19:

The slot or groove-like extensions 16 can be formed with rib-like projections 22 at the sides remote from the SBIPC.

These ribs 22 which, in a way, terminate the extension 16, and face each other in pairs, define reception slots 23, open to the outside, for the conductor 20. The outer ends of the ribs 22 are formed with outwardly inclined funnel-like introduction surfaces 19. The minimum width is, usually, less or at most equal to the outer standard diameter of the wire 20, including its insulation. This is another strain relief, since the wire 20 to be contacted is also retained against tension at a side remote from the slot 15 and, at the same time, providing for an outer closure of the extension 16 when the wire 20 is inserted.

The widths of the slots 15, 23 need not be constant throughout its depth. Frequently, it is desirable to interrupt the projections 14 or 22 at times over the depth of the groove, or slot, such that, for example, in the vicinity of the bottom of the slot, the width is less to obtain a higher degree of clamping for the wire pressed into the extension. This region of decreased widths for the slot 15 is best seen in FIG. 3 at 15*a*. In the embodiments of FIGS. 6, 12 and 15, the regions of decreased widths of the slot 23 is obtained by means of holdback projections 24. These holdback projections 24 are integrally formed on the rib or strip-like projections 22, spaced from the bottom of the slot. They are wedge-shaped, with a profile which increases towards narrowing of the slot, and are formed with holdback shoulders 25, which prevent undesired release of any wire introduced into the respective extension slot. Similar arrangements can be formed on the rib or rail-like projections 14 on the slots 15. These rib or rail-like projections 14 and 22 also increase the creep path, as well as the air path, thus permitting for further decrease of the dimension of the entire terminal and thus permitting fitting of the terminal within a restricted raster.

Figure 17:
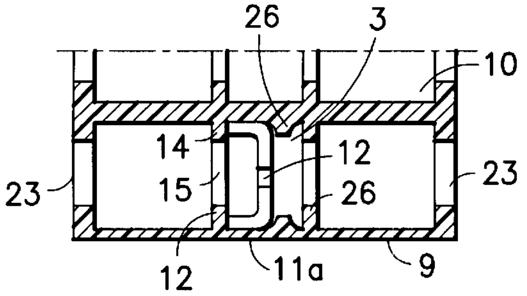
FIG. 17 is a fragmentary cross-sectional view and illustrating another embodiment of the connector of FIG. 12 in a cross-sectional view along line XIV—XIV.
Figure 18:
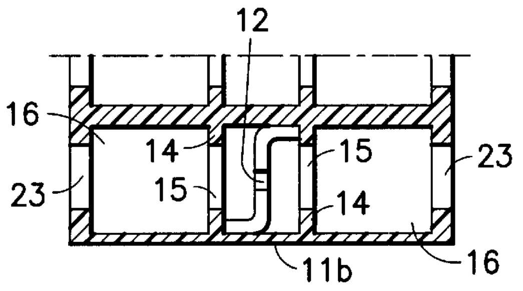
FIG. 18 is a fragmentary cross-sectional view and illustrating another embodiment of the connector of FIG. 12 in a cross-sectional view along line XIV—XIV, and illustrating yet another embodiment.
Figure 19:
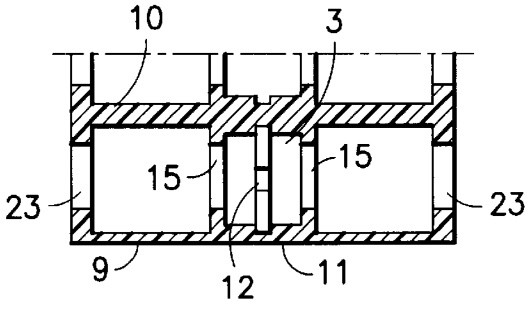
FIG. 19 is a fragmentary cross-sectional view and illustrating another embodiment of the connector of FIG. 12 in a cross-sectional view along line XIV—XIV, and illustrating yet another embodiment.

In very small terminals, it is desirable to form the SBIPCs 11, not as shown in FIGS. 5 and 19, that is, as merely simple, plain, flat small plates, but, rather, to provide the SBIPCs with an embossed or profiled cross-section. This ensures stability and effective clamping and holding of the wire 11, even at smallest dimensions. FIGS. 17 and 18 illustrate SBIPC terminals 11*a* which, in cross-section, are U-shaped, and in the contacting zone 3 are additionally formed with ribs 26 which fix the SBIPC 11*a* at the terminal zone in axial direction. The holding of the SBIPC 11*a* in the other axial direction is provided by the projections 14 of the slot 15.

FIG. 18 illustrates an SBIPC 11*b* which, in cross-section, is essentially S-shaped. In axial direction, it engages the rib or rail-like projections 14 which terminate the extension 16 at both sides of the slot 15.

Figure 8:
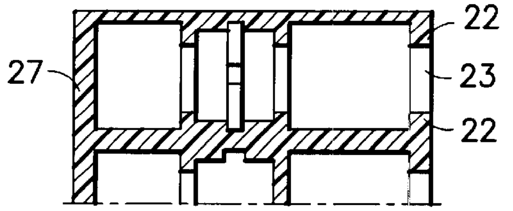
FIG. 8 is a fragmentary cross-sectional view of the embodiment illustrated in FIG. 6, along section line VIII—VIII.

In some terminals and in dependence on the intended use, it may be suitable to form the extension 16 adjacent the slot 15 only on one side of the housing. The method in accordance with the present invention, to be described in detail below, additionally permits to form the terminals in such a way that one of the extensions 16 including the groove 15 are formed with a closing end wall 27 at the facing side thereof, remote from the SBIPC 11. FIGS. 7, 8 illustrate such an embodiment. Such a terminal is particularly suitable when it is placed at the beginning of a wire, or at an end, where the wire is cut. This end wall 27 may also be formed as a frangible, very thin film or skin, if desired with pre-formed break lines or the like, so that the terminal is universally useful, for example, for through-wiring upon pressing a wire 20 into the extensions 16, causing breakage of this frangible wall. If the terminal is formed with two extensions 16, projecting from both sides of the SBIPC 11, these two, frangible walls, can also be used, one, or both of them, being broken in dependence on whether the introduced wire is to have an end at the terminal, or if the terminal is to be through-wired.

Figure 9:
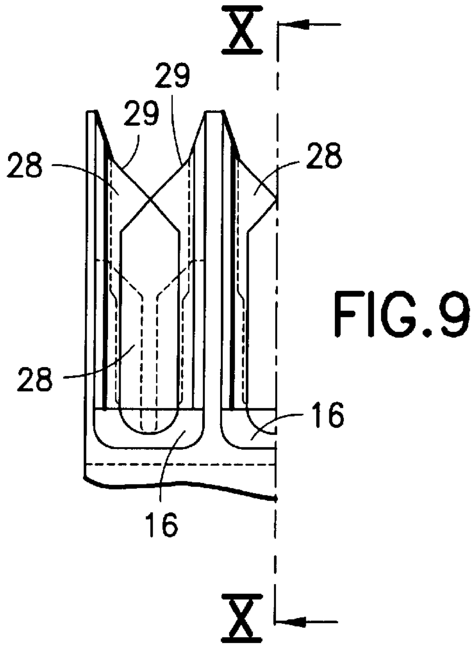
FIG. 9 is a view similar to FIG. 3 and illustrating another embodiment.
Figure 10:
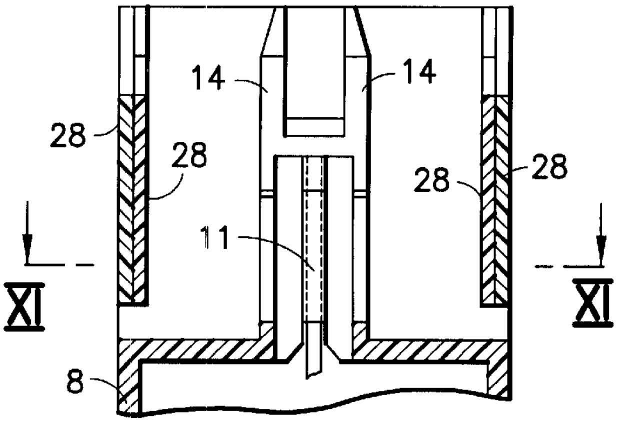
FIG. 10 is a cross-sectional view along line X—X of FIG. 9.
Figure 11:
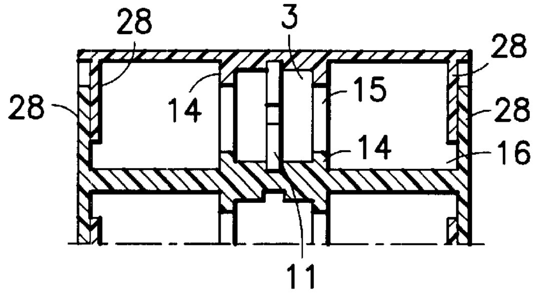
FIG. 11 is a fragmentary sectional view along line XI—XI of FIG. 10.

FIGS. 9 to 11 illustrate other embodiments with an end face closure of the slot or groove-like extensions 15. FIGS. 9–11 illustrate that elastically swingable wings 28, similar to French doors, are formed in the vicinity of the ends on the sidewalls 9, of the end walls of the housing, preferably from the interior thereof. These wings 28 can overlap and, at the side where the wire is to be introduced, be formed with lead-in inclinations 29. When a wire is pressed into the respective groove-like extensions 16, the wings 26 elastically deflect to the side, engage at the inside of the sidewalls 9 and 10, and press into the soft insulation material of the wire 20, thus forming an additional strain relief.

Automatic wiring of the terminals just described is preferably carried out by means of a line-laying tool, as basically shown in FIG. 1. The tool has a housing 30 secured to an industrial positioning system, such as a portal or gantry robot or other automatic tool control, and/or positioning element and, by means of such a control, is positioned on a wiring path with respect to the electrical device, for example a fluorescent lamp luminaire, on a predetermined programmed course. This is described in detail in U.S. Pat. No. 5,515,606, to which specific reference is hereby made.

The housing 30 is formed with a vertical wire-laying finger, or finger element 31 which, in general, has, in cross-section, rectangular shape as shown in chain-dotted representation in FIG. 20, part d. The finger 31 is rounded on the bottom and is formed with a guide groove, or duct 33, which, adjacent to a straight portion, is bent by about 90° at the lower end of the finger 31, terminating in flat end face surfaces 34 which surround a wire exit opening, or outlet 35. Outlet 35 is spaced by only a slight distance from the bottom side 36 of the finger 31, see FIG. 20, part a. The wire duct, or other guide 33, is extended in the housing 30 in a guide tube. A drive system for the wire 20, formed by a pair of endless belt rollers 34, and belts 34*a* engage wire 20, only shown in FIG. 1 in schematic representation. The wire drive is coupled to a length measuring system for the wire 20, of which, schematically, only a measuring wheel 70 is shown. The structure of such a drive for the wire is known and reference is made to U.S. Pat. No. 5,515,606, Albeck et al. The belt drive 34, 34*a* permits supply of wire 20 from a supply spool or the like, in synchronization with the movement path of the wire-laying finger 20 in its programmed movement, so that the amount of wire leaving the outlet 35 is just right for unstressed, yet not excessively loose wire between the terminals to be wired.

An image-scanning system 360, together with an image-reception system 370, form a positioning control system which permits precise positioning of the finger 31 when it is programmed to be placed over a terminal 2, and exact aligned placement of the finger relative to the terminal.

FIGS. 20 and 25 show the association of the finger 31 and a terminal.

A pressure element 37 (FIG. 20, parts a and d) is mounted on the vertical side surface 34 of the finger 31, to be vertically slidable thereon. The pressure element, or pressure stamp 37, is coupled to its own drive system 380 (FIG. 1) on the housing 30. The control and drive system 380 controls, and causes, the pressure element 37 to shift relative to the finger 31 in accordance with a program control. At the side facing the side surface 34, the pressure element 37 has cutting function. A removable cutting blade 38, which has a part circular cutting edge 39, is secured to the pressure element 37. Since the cutting blade 38 is subject to wear, it is readily removable, as schematically indicated by screw 38' (FIG. 21, part a) for replacement. The part-circular blade 38 moves with the pressure element 37 and slides immediately adjacent the side surface 34. The counter surface for the blade 38 is formed by the wire outlet 35 of the finger 21. Upon downward movement of the pressure element together with the blade 38, a wire coming out of the duct 33 at the outlet 35 can be cut off cleanly. The knife blade 38 is narrower than the finger 31 and has a substantially lesser thickness, as best seen in FIG. 20, part a.

The lower facing surface of the pressure element 37 is formed with a centrally symmetrical and, e.g., somewhat key-hole shaped, flute of part-circular cross-section, the radius of which is matched to the outer diameter of the wire 20 to be inserted into the terminal. Accordingly, a wire portion leaving the outlet 35 is received in the flute 40 and laterally supported and guided therein. The knife blade 38 has its cutting edge 390 slightly set back with respect to the flute 40, so that a sharp edge of the knife blade does not form undesired resistance for supply of wire from the finger 31. Any possible differences in level of the facing surface of the pressure element 37 and the upper edge of the wire outlet 35 can be easily compensated by shaping the lower section of the pressure element 37 in the vicinity of the side surface 34 of the finger 31 with a slight inclination, or chamfer, as seen at 41, FIG. 20, part a. This also results in precise alignment of the end of the wire after it leaves the finger 31.

In accordance with a feature of the invention, the pressure element 37 has a special shape; in its lower portion it is essentially rectangular, and has laterally flat sides. The wall thickness, or maximum thickness, is not substantially larger than the external diameter of the insulation of the wire 20. It is grooved with two oppositely located shaped or profiled grooves 42, 43 at its opposite broad sides. These grooves extend to the lower end face, and leave, between respectively opposite grooves, narrow, rib-like pressure surface sections, or portions 46, 47, the widths of which are determined by the width of the clamping slot 12 of the SBIPC 11. The pressure surface portions 46, 47, in any event, are smaller than the diameter of the conductor of the wire 20. The pressure surface portions 46, 47 are of equal length and located, with respect to each other, by a spacing which is matched to, or determined by the dimensions of the raster of the contact terminal 2.

As best seen in FIG. 25, each of the pressure surface portions 46, 47 are delimited, in longitudinal direction, by two strip-like guide portions 48, 49, which are wider than the pressure surface portions 46, 47. The widths correspond, with play or clearance, approximately to the widths of the insertion slot 15 and the reception slot 23, if provided, at the ends of the respectively groove-like extensions 16. These guide portions 48, 49 are preferably rounded, or chamfered at the side facing the pressure surface 46, as seen at the left side of FIG. 25 at 48. FIGS. 21, 22 and 25 clearly show that the wall thickness of the pressure element 37 is so selected that it can fit into the slot-like or groove-like extensions 16 of the terminal 2, leaving some lateral play or clearance. The dimension 32 of the finger 31 is larger. The dimension 37*a* of the pressure element 37 is shown in FIG. 25.

The width of the grooves 42, 43 is equal, and is so matched to the raster dimension of the terminal that, as best seen in FIGS. 23 to 25, when the pressure element 37 engages into the extension 16, the two guide portions 48, 49 can be received in the insertion slots 15 for the respective SBIPC. The respective portion 46, 47, itself, can be received within the SBIPC slit 12. The projections 14, which delimit the contacting zone 3, are located between the knife blade 38 and the opposite sidewall of the groove 42, with lateral play. FIGS. 20 to 22 illustrate a position in which the pressure element 37 engages in both extensions 16. This is a position, shifted by one raster spacing. The pressure surface 46 is introduced into the SBIPC slit 12. The adjacent guide portions 48, 49 engage, from the outside, into the guide slots 15 of the contacting zone. The blade 38 is laterally outwardly adjacent the housing 4.

The pressure element 37, thus, upon dipping into the slot or groove-like extensions 16 and into the chamber of the contacting zone 3 of the terminal 2 can, at the same time, provide for precise aligned guiding and positioning of the respective pressure surface portion 46, 47 with respect to the SBIPC slit 12, with which the wire 20 is to be connected.

The spacing of the pressure surface portions 46, 47, forming insertion zones of the pressure element, are again found in the geometry of the connection terminal. The portions: edge left—center contact—edge right of the housing portions which delimit the terminal 2 is so matched to the spacing of the length of the portions 46, 47 of the pressure element, that collision of the pressure element with housing portions, upon downward movement of the pressure element and insertion and contacting of the wire 20 is effectively prevented. FIGS. 20–29 thus are exploded assembly views associating the wire positioning element 31 with the terminal 2 in various positions.

Pressure Element 37 and Finger 31 Positions, With Reference To FIGS. 20–24 and 25:

The pressure element 37 can be controlled to assume three different positions by the pressure element control unit 380 (FIG. 1).

First position I, FIG. 22:

This position, is used to move the pressure element 37, as well as the finger 31, upwardly and outwardly from a terminal. Pressure element 37 is so spaced above the wire outlet 35 of the finger 31 that the outlet 35 is open and unobstructed. The finger 31, thus, can move while at the same time feeding wire 20 from a terminal, without interference of the housing portions of a terminal 2, in a horizontal direction.

Second position II, FIG. 20:

This is the starting position to effect a contact connection, and especially the beginning of a line, or for later-on through-wiring. The pressure element 37 is raised to an intermediate position, such that its pressure surface portions 46, 47 form at least a smooth transition to the upper edge of the outlet 35. At least the pressure portion 47 should be in this position. As noted above, the knife blade 38 is slightly upwardly set back, so that the cutting edge 390 thereof does not interfere with feed of the wire 20. The horizontal wire portion, extending from the outlet 35, is supported at the side remote from the terminal 2 by the pressure portions 46, 47, and the wire can be located in the flute 40.

Third position III, FIG. 24:

In this position, a wire end can be cut, and simultaneously the wire is connected to the SBIPC 11. The pressure element 37 is projected downwardly with respect to the finger 31, so that, when the outlet 35 is in alignment with the respective terminal, the cut-off end of the wire 20 can be pressed into the slit 12 of the SBIPC 11 of the terminal 2. For this operation, the finger 31 is raised over the housing portion of the terminal 2.

For ease of analysis, the first position I of the pressure element 37 is shown at A and of finger 31 t A'; the second position II of the pressure element 37 is shown at B and of the finger at B'.

A first position of the pressure element 37 with respect to the finger, where the finger is in a lower position and the pressure element in a upper position, is shown at I; if both finger and pressure element move conjointly, that is, maintain their relative spatial alignment, the position II is shown; and when the reverse of position I is obtained, namely the pressure element 37 is below the position of the finger 31, see for example FIG. 24, the third position III for the pressure element 37 is shown. This permits cut-off of the wire.

Method of Wiring of an Electrical Device.

Upon starting of the wiring along a predetermined wiring path, finger 37 is brought to a start position at the terminal to be connected. Pressure element 37 is placed in the second position (FIG. 20) on the finger 31. Wire 20 is fed from the finger 31, until the wire is in alignment with the pressure surface 46, that is, extended beyond the opening 35 of the finger 31, and is within the region of the groove 42.

The finger 31, together with the pressure element 37, then is so positioned over the terminal 2, that the first pressure zone formed by the pressure portion 46 is in alignment with the center of the contacting zone 3. The parts will have the position seen in FIG. 20, in which the horizontal wire portion, within the flute 40, and supported against the pressure surfaces 46, 47, is above the housing 4.

Starting from this position, the finger 31 as well as the pressure element 37, are moved downwardly together. In other words, pressure element 37 and finger 31 retain their relative spatial positions during this movement. Pressure element 37 engages from the top into the terminal 2. The finger, as well as the knife blade 38, are laterally outwardly of the housing 4 of the terminal 2. Pressure element 37, with the finger both move downwardly to such an extent until the wire 20 is reliably connected within the slit 12 of the SBIPC 11. This position is shown in FIG. 21.

The pressure element 37 then is raised upwardly on the finger 31 into the first position. The finger 31 remains in a position, spaced from the housing 4, and the terminal. The finger 31, lowered or raised, is then, together with the pressure element 37, moved by the positioning system to the next subsequent terminal 2. At least when it reaches the terminal 2, the finger 31 as well as the pressure element 37, will be brought into starting position, as described in connection with FIG. 20.

For through-wiring of the wire 22 terminal, the finger and the pressure element are first positioned in the starting position of FIG. 20, and then moved to the terminal connection of FIG. 21. Thereafter, the pressure element 37 returns into the first position, as seen in FIG. 22, and the finger can move to the next subsequent terminal 2. The through-wired electrical line is shown in FIG. 22 at 20*a* in broken-line configuration.

Contacting and Cutting Off the Wire.

First, finger 31 with the pressure element 37 raised, is positioned over the respective terminal in such a manner that the pressure surface portion 47, adjacent the knife blade 38, and thus forming the second pressure zone, is in alignment with the center of the contacting zone 3—see FIGS. 23, 25. Finger 31 is then held stationary, and starting from the position shown in FIG. 23, the pressure element 37 is pushed downwardly in its third position. In this operation, the knife blade 38 cuts the wire 20 immediately adjacent the edge of the outlet 35 of the wire duct on the finger. The edge of the outlet 35 forms a counter element for the knife blade 38. The cut-off end of the wire, upon rapid movement of the pressure element 37 within its flute 40 and especially the pressure surface 47, is held in position, and pressed into the guide slots 15, as well as into the SBIPC slit 12, until the position shown in FIG. 24 is reached. FIG. 25, as well as FIG. 24, clearly show that cutting the wire occurs in close vicinity to the SBIPC 11. The pressure element 37 is then raised again to the first or second position. The line-laying tool 31 can move to the next terminal without interference.

FIG. 25, drawn to an enlarged scale, shows that the knife blade 38 can engage into the associated groove-like extension 16. This extension 16 may even be closed at the end, as explained in connection with FIGS. 6 to 11. Of course, a similar situation pertains with respect to the start of the wire. An end-like closure at the beginning of the wire of the extension 16, as well as at the end of the wire, permits further lengthwise reduction of the terminal elements without interfering with protection against accidental touching of a blank end of a conductor, which may be energized.

In certain instances, it is desirable to especially prevent release of a cut end of wire from the pressure element 37 before it is pressed into the insertion slot 15 and, if provided, into one of the slots 23. Pre-centering or pre-positioning of the wire 20 immediately before pressing the wire into the slit 12 of the SBIPC, with respect to the contacting zone 3, ensures accurate positioning. The shape of the terminal shown in FIGS. 15 and 16 is particularly suitable in that case. The two sidewalls 9, 10 of each one of the terminals 2 are formed with ribs or rail-like projections 14 in the region of the insertion slots 15, and are drawn upwardly over the upper edge of the sidewalls 9 and 10, to result in integrally formed, projecting tongue-like portions. The portions 14a are formed with inlet inclined surfaces 19, and thus permit an extension of the introduction slot 15 in the direction to the insertion or introduction side.

FIGS. 26 to 29 illustrate the method to contact a terminal 2 from point of view of control of the wire insertion finger. FIGS. 26,27 illustrate contacting a terminal at the beginning of the wire. First, the finger 31, together with the pressure element 37 in the second position II, are placed above the terminal in such a manner that the pressure surface 46 is in alignment with the center of the contacting zone 3, as schematically indicated by the broken lines in FIG. 26. The horizontal wire 20 can be brought already between the extending portions 14*a*, thereby obtaining pre-centering and pre-fixing or alignment of the wire before actual contact connection is to be made.

Basically the same applies for though-wiring and for cutting-off of the wire, which is clearly illustrated in FIGS. 28, 29. The wire 20 is received, see FIG. 28, between the portions 14*a*, so that upon movement into the insertion position of FIG. 29, it cannot escape laterally from the pressure element 37. For cutting-off the wire, see FIG. 29, the pressure element 37 is brought in the position III; both the finger and the pressure element 37 are so aligned over the terminal that the pressure surfaces 47 are in the center of the terminal 2, permitting cutting-off of the wire of the wire 20 just beyond the insertion portions 14*a*.

The remaining course of wiring and connecting-contacting has been explained in connection with FIGS. 20–25 and will be clear from those Figures and the associated descriptions.

The automatic wiring system and method in accordance with the present invention, particularly when combined with the wire positioning element having the finger 31 and the pressure element 37, can also be used to wire terminals of the prior art, for example as described in the referenced U.S. Pat. No. 5,515,606, Albeck et al. These terminals are so designed that the extensions 16 are wide enough to receive the entire thickness of the positioning finger 31, and, thus, the lateral spacing of individual terminals in a group is much larger. This universal use of the new wiring finger structure is of specific advantage since in actual practice, for example upon automatic wiring of fluorescent light fixtures, cases may arise in which, for example, due to different electrical requirements, various types of terminals are placed in one fixture, that is, terminals in accordance with the prior art, as well as those described herein. The wiring positioning element or finger 31 together with the pressure element 37, thus, is entirely compatible with prior art terminals, as well as with the terminals in accordance with the present invention. Thus, it can be used independently on the type of terminal which is to be contacted.

The sequence or functions upon wiring of prior art terminals can occur essentially as described in the aforementioned U.S. Pat. No. 5,515,606, Albeck et al. Additionally, it should be noted that in a second position II, according to FIG. 20, the finger 31 and the pressure element 37 are appropriately placed above the wire 20, and the beginning of the wire is fed from the wire outlet 35 to such an extent that it is placed beneath the pressure surface portion 47, immediately adjacent the knife blade 38, that is, in the second pressure insertion zone. The pressure element 37, and the finger 31, then are both moved downwardly, while maintaining their relative spatial association. The finger 31 can fit in the prior art associated extensions, the width of which is greater than the thickness of the finger 16. Due to the conjoint movement of the finger and of the pressure element, the wire it not cut.

If an initial portion of the wire is to be contacted, or, if through-wiring is to be carried out, the pressure element 37 is so positioned with respect to the terminal 2 that the pressure surface portion 47, adjacent the knife blade 48 is always used; in other words, the second pressure zone 47 is employed.

At the end of the wire, the contact is made with the wire before it is being cut. Cutting of the wire the is obtained by relative movement between the knife blade 38 and the finger 31 in such a manner that the pressure element holds the contacted line in the slit 12 of the SBIPC 11. The finger 31 can be moved outwardly of the extension.

Various changes and modifications may be made within the scope of the inventive concept.

What is claimed is:

1. A wire positioning finger unit comprising:

a positioning finger (31) having a wire guide therein (33) terminating at a wire outlet (35) in one side of said positioning finger;

a pressure element (37) movable relative to said positioning finger (31) and positioned at a side of the wire outlet (35), said pressure element having a pressure surface (46, 47) located proximate the wire outlet (35) for engagement with a wire (20) fed by said positioning finger; and a cutting member (38) on the pressure element (37) at the side thereof adjacent said wire outlet;

wherein said wire outlet (35) provides a counter-surface for said cutting member and wherein said pressure element is movable relative to said positioning finger (31) to assume at least three positions (I, II, III) wherein in a first position (I) the pressure surface (46, 47) is spaced from said wire outlet (35) to permit free feeding of said wire from said wire outlet;

a second position (II) in which said pressure surface (46, 47) essentially forms an extension of an upper edge of said wire outlet (35); and a third position (III) in which said pressure surface is located below said wire outlet (35).

2. The wire positioning finger unit of claim 1, wherein a width (37*a*) of the pressure element (37) transverse with respect to the pressure surface (46) is less than the width of the finger (31).

3. The wire positioning finger unit of claim 1, wherein said cutting member comprises a cutter blade (38).

4. The wire positioning finger unit of claim 3, wherein said cutter blade is replaceably secured to said pressure element (37).

5. The wire positioning finger unit of claim 1, wherein said wire positioning finger unit is adapted to wire an electrical terminal (2) of an electrical device (1), with said terminal (2) having an insulated housing (4) and a contact zone (3) defined within said insulated housing, wherein said pressure surface comprises two pressure surface sections (46, 47) having a common axis of symmetry (45) extending longitudinally with respect to the pressure surface; and wherein a spacing and a length of said pressure surface are dimensioned with respect to the dimensions of the contact zone (3) of the terminal (2).

6. The wire positioning finger unit of claim 5, wherein the pressure element (37), in portions thereof adjacent said two pressure surface sections (46, 47) includes shaped regions, which are wider than widths of said two pressure surface sections, and shapes of the shaped regions being matched to a shape of the contacting zone (3) of said terminal.

7. The wire positioning finger unit of claim 6, wherein the shaped regions (48, 49) are positioned at least at an end of said two pressure surface sections, or, respectively, between adjacent pressure surface sections.

8. The wire positioning finger unit of claim 5, wherein said two pressure surface sections (46, 47) comprise a rib, part of the pressure element (37), said rib parts having wall thicknesses which are at most equal to a diameter of a conductor of said wire (20) to be contacted with said terminal.

9. The wire positioning finger unit of claim 1, further comprising a guide surface (41) formed on said pressure element (37) for guiding said wire (20) to be contacted.

10. A wire positioning finger unit comprising:

a positioning finger (31) having a wire guide therein (33) terminating at a wire outlet (35) in one side of said positioning finger;

a pressure element (37) movable relative to said positioning finger (31) and positioned at a side of the wire outlet (35), said pressure element comprising a hollow, necked flute (40) within which a pressure surface (46, 47) is located proximate the wire outlet (35) for engagement with a wire (20) fed by said positioning finger;

and wherein said pressure element is movable relative to said positioning finger (31) to assume at least three positions (I, II, III) wherein in a first position (I) the pressure surface (46, 47) is spaced from said wire outlet (35) to permit free feeding of said wire from said wire outlet;

a second position (II) in which said pressure surface (46, 47) essentially forms an extension of an upper edge of said wire outlet (35); and a third position (III) in which said pressure surface is located below said wire outlet (35).

* * * * *